UNITED STATES PATENT OFFICE.

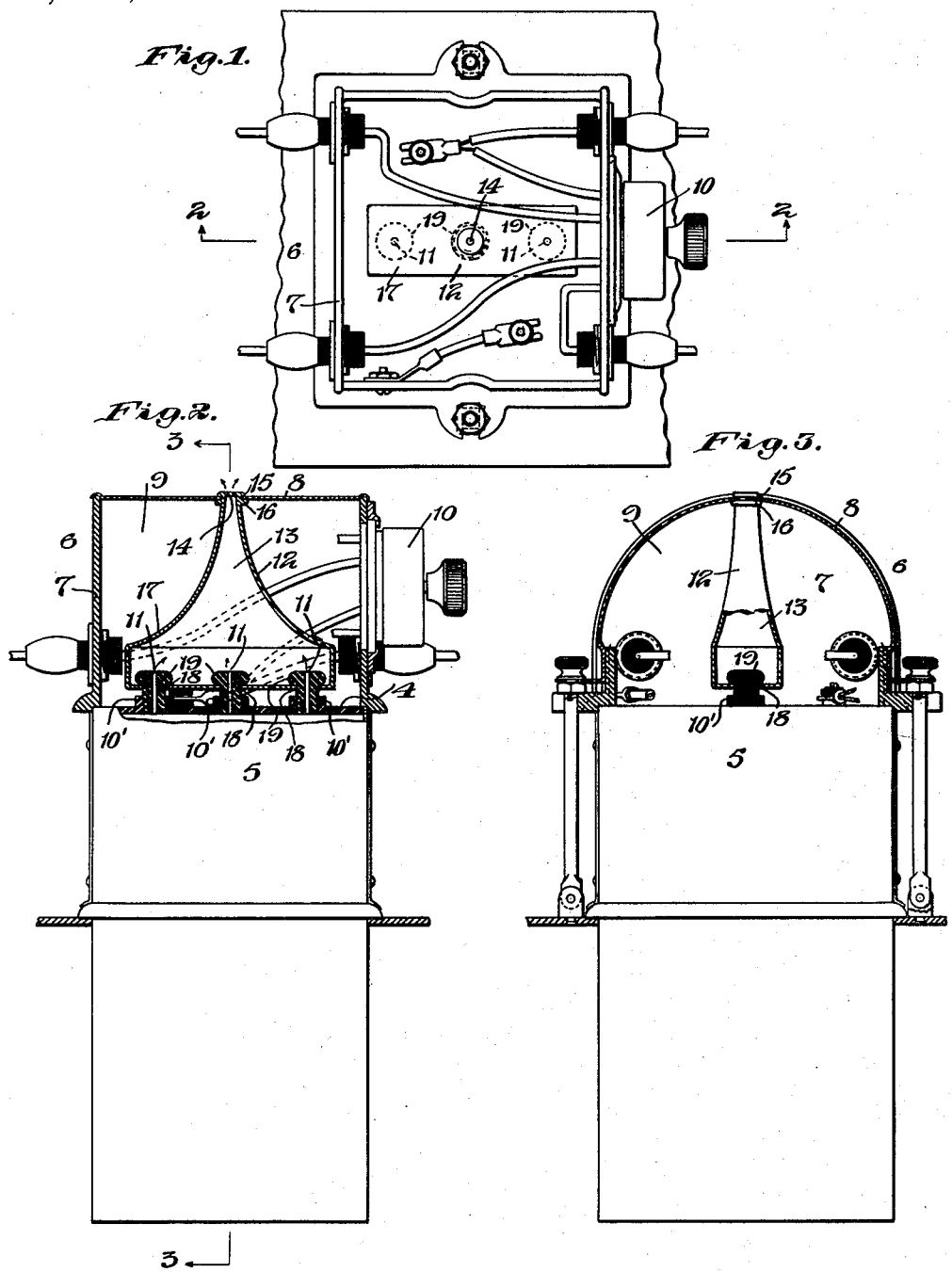

ELLSWORTH A. HAWTHORNE, OF BRIDGEPORT, CONNECTICUT.

STORAGE BATTERY OR HOUSING.

1,208,959.  Specification of Letters Patent.  Patented Dec. 19, 1916.

Application filed September 24, 1913. Serial No. 791,674.

*To all whom it may concern:*

Be it known that I, ELLSWORTH A. HAWTHORNE, a citizen of the United States, and a resident of Bridgeport, in the county of Fairfield and State of Connecticut, have invented an Improvement in Storage Batteries or Housings, of which the following description, in connection with the accompanying drawings, is a specification, like characters on the drawings representing like parts.

This invention relates to housings for storage batteries, and more especially to a housing, or casing, having provision for conducting the acid fumes to the exterior of the casing, as well as to conduct the acid itself to the exterior of the casing, in the event of accidental upsetting of the battery, so that the conductors and switch connection within the casing shall not become corroded and injured by the acid or its fumes.

My invention will be best understood by reference to the following specification, when taken in connection with the accompanying drawings of one specific embodiment thereof, while its scope will be more particularly pointed out by the appended claims.

In the drawings: Figure 1 is a plan of a battery and its housing, with the shell of the cover removed; Fig. 2 is a sectional view, partly in elevation, on line 2—2 of Fig. 1; and Fig. 3 is a sectional view on line 3—3 of Fig. 2.

Referring to the drawings, and to the embodiment of my invention which I have selected for illustration, I have there shown a storage battery 4 of common form, having a casing, or housing, 5, provided with a hood 6 comprising a frame 7 and a shell 8, forming a chamber 9 above the battery. This chamber serves as a convenient housing for the connections leading from the battery to an appropriate switch 10, and from the switch to the various devices, not shown, to be controlled by the switch. The construction of the latter, and its connections, may be of any appropriate character, which it will be unnecessary here to describe.

The battery is provided with one or more vents for the acid fumes, the number of such vents in the present instance being three, each designated by the numeral 10'. These vents may be of any other appropriate character, but herein each comprises a hard rubber nipple having a passage 11 for the escape of the acid fumes. Unless some means were provided for conducting the acid fumes to the exterior of the casing, the metallic switch parts and the conductors would become corroded by the fumes; moreover, should the battery and its casing be accidentally upset, acid would run out through the vents into the chamber 9, resulting in serious injury to the switch and its connections, as well as the metallic parts of the housing. In order to prevent injury due to either of these causes, I have provided means for conducting the fumes or acid itself, as the case may be, from the vents of the battery to the exterior of the casing. Such means may be of any other appropriate character, but herein I have provided a conduit 12, preferably formed of flexible soft rubber, in the form of a sac having a chamber 13 communicating with the three vents, and having a vent hole 14 conveniently located as shown in a neck formed with the sac, this hole leading to the external atmosphere. As a means for securely holding this conduit in place, and preventing leakage of the acid or its fumes, the conduit has an appropriate interlocking attachment to the vents, as well as to the casing. To this end, the latter is herein provided with an aperture 15, through which the conduit extends, the latter being provided with a circumferential groove 16 to receive the margin of the aperture, as clearly shown in Fig. 2. The groove thus forms inner and outer shoulders, or beads, which securely interlock with the casing, and prevent accidental displacement of the conduit. The latter may be introduced into the aperture in the casing by collapsing the terminal portion of the conduit, and introducing the same into the aperture, after which the conduit will spring back into its original form, as shown in Fig. 2. As a means for attaching the conduit to the vents, and insuring a tight fit, the conduit is herein provided with a widened portion 17, having a plurality of apertures 18, corresponding in number to the vents and encircling the latter, which are provided with enlargements 19 preventing accidental withdrawal of the conduit. The latter is attached to the vents by simply stretching the rubber conduit to enlarge its aperture and introduce the vents into their proper places, the size of the apertures being such that the conduit will closely hug the neck of each vent between the enlargement of the vent and the body of the battery.

It will now be evident that whatever fumes arise from the acid within the battery will be conducted through the small vent hole 14 to the external atmosphere, thus preventing corrosion of the connections within the chamber 9. It will also be apparent that if the battery and its casing should be accidentally upset, none of the acid could leak into the chamber but would be held in the conduit, or conducted by the latter to the exterior of the casing, where it could do no harm.

While I have herein shown and described one form of my invention for illustrative purposes, and have disclosed and discussed in detail the construction and arrangement incidental to one specific application thereof, it is to be understood that the invention is limited neither to the mere details or relative arrangement of parts, nor to the specific construction herein shown, but that extensive deviations may be made from the illustrated form or embodiment of the invention, without departing from the principles thereof.

Having thus described my invention, what I claim and desire by Letters Patent to procure is:

1. The combination with a storage battery having a vent, of a closed battery casing provided with an aperture, and a flexible, acid resisting conduit extending from said vent through said aperture and engaging the exterior wall of the casing whereby to provide a continuous resisting passage from said vent to the open.

2. The combination with a storage battery having a vent of a closed battery casing provided with an aperture, and a flexible conduit extending from said vent through said aperture and provided with a groove in which the margin of said aperture is disposed.

3. The combination with a storage battery having a plurality of vents provided with enlargements, of a battery casing provided with an aperture, and a flexible conduit provided with a plurality of apertures to receive said vents, respectively, said enlargements being located within said conduit, and said conduit extending through the aperture in said casing and provided with a groove in which the margin of the casing aperture is located.

4. A conduit for conducting gas from battery cells to the exterior of an inclosing casing therefor comprising a sac of flexible material having an open ended neck formed for suspension in an aperture in the wall of the casing and openings in the wall of the sac to receive cell-venting nipples.

In testimony whereof, I have signed my name to this specification, in the presence of two subscribing witnesses.

ELLSWORTH A. HAWTHORNE.

Witnesses:
E. HORACE HAWTHORNE,
MABELLE K. PEDERSEN.